US006718338B2

(12) United States Patent
Vishnubhotla

(10) Patent No.: US 6,718,338 B2
(45) Date of Patent: Apr. 6, 2004

(54) STORING DATA MINING CLUSTERING RESULTS IN A RELATIONAL DATABASE FOR QUERYING AND REPORTING

(75) Inventor: Prasad Rajendra Vishnubhotla, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 325 days.

(21) Appl. No.: 09/891,342

(22) Filed: Jun. 26, 2001

(65) Prior Publication Data
US 2003/0018620 A1 Jan. 23, 2003

(51) Int. Cl.[7] .............................................. G06F 17/30
(52) U.S. Cl. ....................................................... 707/102
(58) Field of Search ........................ 707/6, 10, 2, 102, 707/4, 3

(56) References Cited
U.S. PATENT DOCUMENTS 5,956,717 A * 9/1999 Kraay et al. .................. 707/10
6,003,029 A * 12/1999 Agrawal et al. ............... 707/7
6,356,897 B1 * 3/2002 Gusack ........................... 707/4
6,377,287 B1 * 4/2002 Hao et al. .................... 345/853

* cited by examiner

Primary Examiner—Safet Metjahic
Assistant Examiner—Sana Al-hashemi
(74) Attorney, Agent, or Firm—John R. Biggers; Mark S. Walker; Biggers & Ohanian PLLC

(57) ABSTRACT

Storing data mining clustering results in a relational database for querying and reporting, including reading, from a hierarchical clustering node, clustering data describing a clustering, and recording the clustering data in a relational clustering record; reading, from a hierarchical cluster node embodied in the hierarchical representation of data mining results, cluster data describing a cluster, and recording the cluster data in a relational cluster record; reading, from a hierarchical cluster attribute node embodied in the hierarchical representation of data mining results, cluster attribute data describing a cluster attribute, and recording the cluster attribute data in a relational cluster attribute record; reading, from a hierarchical cluster attribute bin node embodied in the hierarchical representation of data mining results, cluster attribute bin data describing a cluster attribute bin, and recording the cluster attribute bin data in a relational cluster attribute bin record.

48 Claims, 5 Drawing Sheets

| Data Element Name | Data Element Meaning or Usage |
|---|---|
| 202 — Clustering_id | Unique identifier for the clustering |
| 204 — Clustering_name | Text name for the clustering |
| 205 — Clustering_desc | Description of the purpose of the clustering |
| 206 — Clustering_type | Type of clustering (demographic or neural) |
| 208 — Num_clusters | Number of clusters given by the clustering |
| 210 — Num_attributes | Number of attributes considered in clustering |
| 212 — Clustering_alg | Clustering algorithm used |
| 214 — Num_items | Number of data items input to the clustering |

FIG. 2

Relational Clustering Record 200

| Data Element Name | Data Element Meaning or Usage |
|---|---|
| 302 — Cluster_id | Unique identifier for the cluster |
| 304 — Clustering_id | Id of the clustering to which the cluster belongs |
| 305 — Cluster_index | Ordinal number of the cluster |
| 306 — Cluster_desc | Description of the purpose of the cluster |
| 308 — Num_items | Number of data items in the cluster |

FIG. 3

Relational Cluster Record 300

| Data Element Name | Data Element Meaning or Usage |
|---|---|
| 402 — Attribute_id | Unique identifier of the attribute instance |
| 404 — Clustering_id | Id of the clustering to which the attribute instance belongs |
| 406 — Cluster_id | Id of the cluster the attribute instance belong to |
| 408 — Attribute_type | Type of attribute (categorical, continuous) |
| 410 — Attribute_name | Text name of the attribute |
| 412 — Attribute_desc | Description of the attribute |
| 414 — Active_sup_type | Whether the attribute is used as active or supplimentary |
| 416 — Num_categories | Number of categories - in the case of categorical attributes |
| 418 — From_range | Lowest value allowed - in the case of continuous attributes |
| 420 — To_range | Highest value allowed - in the case of continuous attributes |
| 422 — Num_items | Number of data items |

FIG. 4  Relational Cluster Attribute Record 400

| Data Element Name | Data Element Meaning or Usage |
|---|---|
| 502 — Bin_id | Unique identifier for the attribute bin |
| 504 — Clustering_id | Id of the clustering to which the attribute bin belongs |
| 506 — Cluster_id | Id of the cluster to which the attribute bin belongs |
| 510 — Attribute_id | Id of the attribute to which the attribute bin belongs |
| 514 — Bin_name | Text name of the attribute bin |
| 516 — Category_name | Category name - in the case categorical attribute |
| 518 — From_range | Lowest value in the bin |
| 520 — To_range | Highest value in the bin |
| 522 — Num_items | Number of items |
| 524 — Value_sum | Sum of values in the bin (as a statistical measure) |
| 526 — Value_sqr sum | Sum of the square of values in the bin (as a statistical measure) |

FIG. 5   Relational Cluster Attribute Bin Record 500

STORING DATA MINING CLUSTERING RESULTS IN A RELATIONAL DATABASE FOR QUERYING AND REPORTING

BACKGROUND OF THE INVENTION

1. Field of the Invention

The field of the invention is data processing, or, more specifically, methods, systems, and products for storing data mining clustering results in a relational database for querying and reporting.

2. Description of Related Art

Data mining is an analytic technique to dynamically discover patterns in historical data records and to apply properties associated with these records to production data records that exhibit similar patterns. Based on historical data, a data mining algorithm first generates a data mining model that captures the discovered patterns and produces data mining results that describe the statistical distribution of the historical data along the discovered patterns. These data mining results are then used to visualize the model quality so that an analyst can either tune the data mining model to improve its quality or—after some amount of tuning— certify that it is of good quality. In the latter case, we can go to the next step of applying the certified data mining model to production data.

Data mining tools such as IBM's Intelligent Miner currently produce data mining results in a proprietary representation. Intelligent Miner also provides a converter from this proprietary representation to an XML (eXtensible Markup Language) format known as PMML (Predictive Modeling Markup Language). Both these representations are difficult to query for lack of querying tools that match these representations (a new query language called XQuery is being proposed to query XML data, but it will be quite some time before this technology takes hold). Accordingly, both these representations are still very low-level for most visualization tools which are inherently designed to read data from a relational database rather than from some internal representations. What is needed here is a relational representation of data mining results so that the data mining results can be stored directly in a relational database. Obtaining a relational representation of data mining results is non-obvious due to the complexity of their internal representations.

SUMMARY

In summary, this specification discloses methods, systems, and products for storing data mining clustering results in a relational database for querying and reporting, embodiments typically applied to data mining results from scoring of data items in operational data, embodiments typically including reading, from a hierarchical clustering node embodied in a hierarchical representation of data mining results, clustering data describing a clustering, and recording the clustering data in a relational clustering record, wherein the relational clustering record includes a clustering identification field. Embodiments typically include reading, from a hierarchical cluster node embodied in the hierarchical representation of data mining results, cluster data describing a cluster, and recording the cluster data in a relational cluster record, wherein the hierarchical cluster node is embodied in a position in the hierarchy below the hierarchical clustering node, the relational cluster record is related to the relational clustering record through a foreign key comprising the clustering identification field; and the relational cluster record includes a cluster identification field.

Embodiments typically include reading, from a hierarchical cluster attribute node embodied in the hierarchical representation of data mining results, cluster attribute data describing a cluster attribute, and recording the cluster attribute data in a relational cluster attribute record, wherein the hierarchical cluster attribute node is embodied in a position in the hierarchy below the hierarchical cluster node, the relational cluster attribute record is related to the relational cluster record through a foreign key comprising the cluster identification field; the relational cluster attribute record is related to the relational clustering record through a foreign key comprising the clustering identification field; and the relational cluster attribute record includes a cluster attribute identification field. Embodiments typically include reading, from a hierarchical cluster attribute bin node embodied in the hierarchical representation of data mining results, cluster attribute bin data describing a cluster attribute bin, and recording the cluster attribute bin data in a relational cluster attribute bin record, wherein the hierarchical cluster attribute bin node is embodied in a position in the hierarchy below the hierarchical cluster attribute node, the relational cluster attribute bin record is related to the relational cluster attribute record through a foreign key comprising the cluster attribute identification field; the relational cluster attribute bin record is related to the relational cluster record through a foreign key comprising the cluster identification field; and the relational cluster attribute bin record is related to the relational clustering record through a foreign key comprising the clustering identification field.

In typical embodiments, the cluster data, the clustering data, the clustering attribute data, and the cluster attribute bin data comprise data mining results generated by at least one data mining operation performed upon operational data using a trained data mining model. In typical embodiments, the relational cluster attribute bin record includes a cluster attribute bin identification field. In typical embodiments, the clustering data as recorded in the relational clustering record includes a unique identifier for the relational clustering record; a text description of the purpose of a clustering represented by the relational clustering record; a clustering type; a number of clusters given by the clustering; a number of attributes considered in the clustering; an algorithm field identifying the clustering algorithm used in the clustering; and an items numeric field that stores the number of data items input to the clustering from the operational data. In some embodiments, the clustering type has the value "demographic." In other embodiments, the clustering type has the value "neural."

In typical embodiments, the cluster data as recorded in the relational cluster record comprises a unique identifier for the cluster; a unique identifier of a relational clustering record to which the relational cluster record related; an ordinal number of the relational cluster record; a text description of the purpose of the cluster represented by the relational cluster record; and a numeric field identifying the number of data items from the operational data that are represented in records related to the relational cluster record. In typical embodiments, the cluster attribute data as recorded in the relational cluster attribute record comprises a unique identifier of the relational cluster attribute record; a unique identifier of a relational clustering record to which the relational cluster attribute record is related; a unique identifier of a relational cluster record to which the relational cluster attribute record is related; an attribute type; a text name of a relational cluster attribute represented by the relational cluster attribute record; a text description of the relational cluster attribute; a use type field; a categories numeric field indicating a number of categories associated with the cluster attribute when the attribute type has the value "categorical;" a lowest value numeric field indicating a lowest value allowed when the attribute type has the value "continuous;" a highest value numeric field indicating a highest value allowed when the attribute type has the value "continuous;" and an items numeric field identifying the number of data items from the operational data that are represented in records related to the relational cluster attribute record. In some embodiments, the use type field has the value "active." In some embodiments, the use type field has the value "supplementary." In some embodiments, the attribute type has the value "categorical." In some embodiments, the attribute type has the value "continuous."

In typical embodiments, the cluster attribute bin data as recorded in the relational cluster attribute bin record comprises a unique identifier of the attribute bin; a unique identifier of a relational clustering record to which the relational attribute bin record is related; a unique identifier of a relational cluster record to which the relational attribute bin record is related; a unique identifier of a relational attribute record to which the relational attribute bin record is related; a text name for the attribute bin represented by the relational attribute bin record; a category name; a lowest value numeric field in which is stored the lowest value in the bin; a highest value numeric record in which is stored the highest value in the bin; an items numeric field in which is stored the number of items in the bin; a values sum numeric field in which is stored the sum of the values in the bin; and a squares numeric field in which is stored the sum of the squares of values in the bin.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

FIG. 2 is an example of an embodiment of a relational clustering record.

FIG. 3 is an example of an embodiment of a relational cluster record.

FIG. 4 is an example of an embodiment of a relational cluster attribute record.

FIG. 5 is an example of an embodiment of a relational cluster attribute bin record.

DETAILED DESCRIPTION OF EXEMPLARY EMBODIMENTS

Introduction

Figure 1:
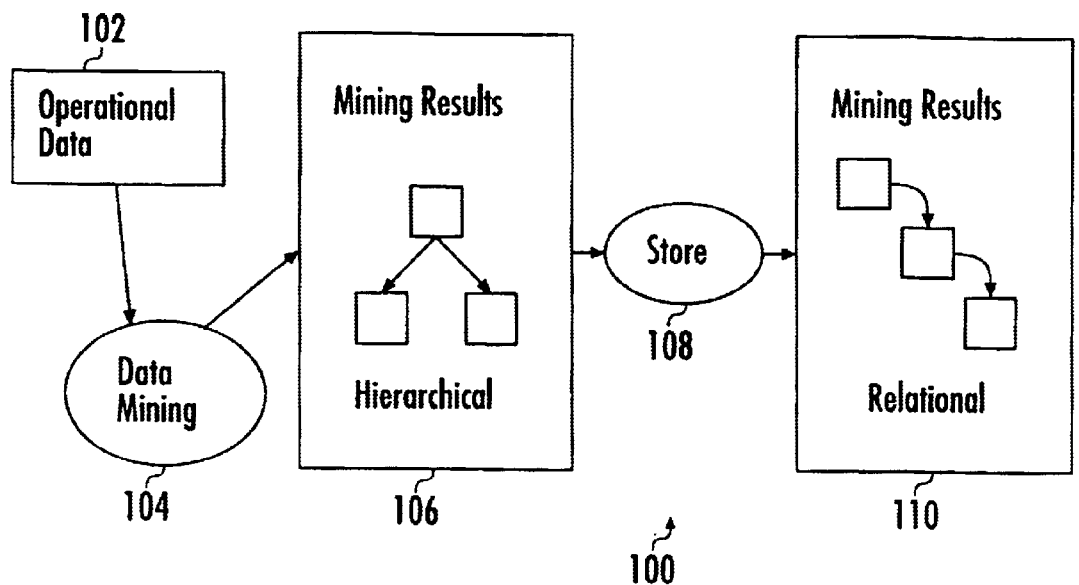
FIG. 1 is a general process flow diagram illustrating a typical example embodiment of the present invention.

The present invention is described to a large extent in this specification in terms of methods for storing data mining clustering results in a relational database for querying and reporting. Persons skilled in the art, however, will recognize that any computer system that includes suitable programming means for operating in accordance with the disclosed methods also falls well within the scope of the present invention.

Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit. The invention also may be embodied in a computer program product, such as a diskette or other recording medium, for use with any suitable data processing system.

Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Definitions

In this specification, the terms "field" and "data element" are used as synonyms referring to individual elements of digital data. Aggregates of data elements are referred to as "records" or "data structures." Aggregates of records are referred to as "tables" or "files." Aggregates of tables are referred to as "databases." Definitions of complex data structures that include member methods, functions, or software routines in addition to data elements are referred to as "classes." Instances of complex data structures are referred to as "objects" or "class objects."

A "foreign key" is a field in a first relational record that identifies a second relational record. When a first relational record has a foreign key identifying another relational record, the two records are said to be "related." Files or table containing related records are themselves said to be related. Aggregates of related records in tables or files are called "relational databases." Records and fields in a table in a relational database are sometimes referred to respectively as "rows" and "columns."

The term "attribute" is used in this specification only to refer to the cluster attribute records comprising results of data mining operations. It is common to use the term "attribute" as a synonym for "field" and "data element," but "attribute" in this specification is used only to refer to attribute records in data mining results typically in phrases such as "cluster attribute" or "cluster attribute bin," referring to these particular kinds of data structures in data mining results. In this specification, individual elements of digital data are called "fields" or "data elements."

The "Standard Query Language", or "SQL," is an industry-standard data base query language. The industry-standard SQL Data Definition Language ("DDL") is often used to create data schema or record structures for inclusion in data stores or files. In this specification, scripts operable as DDL scripts for creating data structures in files are referred to as DDL scripts or as SQL scripts or as SQL DDL scripts.

DETAILED DESCRIPTION

In this disclosure, we present a relational representation for the results of a data mining algorithm called clustering (also called segmentation) and show how a visualization tool can query and extract information from this relational representation. This technique is used in many embodiments of the present invention to obtain relational representations for the results of other data mining algorithms as well. In describing typical embodiments of the present invention, we use IBM's Intelligent Miner as the mining tool. The solution, however, applies to other mining tools as well. We present the solution in the following order of description:

Any company's marketing department spends much of its effort identifying market segments. Segments are groups of shoppers with enough similarities that they qualify for the same marketing campaign. The traditional and most often used method to identify market segments is by constraining various attributes of shoppers (for example, age, sex, income, or geography). Such segments can be identified using reporting and query or OLAP tools (tools for On-Line Analytical Processing) once you decide on the constraints that define the segments.

The data mining technique of clustering, on the other hand, lets you dynamically discover segments of shoppers with similar characteristics without having to specify any constraints on the attributes. Intelligent Miner does clustering by searching the records for characteristics that most frequently occur in common, and then grouping the related records into clusters. A marketing manager can inspect these clusters and select some of them as market segments. Thus, clustering makes it possible to identify market segments that might not have been discovered using more traditional methods.

It should be noted that whereas Intelligent Miner uses the phrases clustering and cluster, the phrases segmentation and segment are also used in the literature and in practice. Throughout this disclosure, we will use segmentation and segment synonymously with clustering and cluster respectively as used in Intelligent Miner.

Intelligent Miner's clustering results contain the number of detected clusters and the characteristics that make up each cluster. In addition, the results show how these characteristics are distributed within the clusters. If the clustering results are stored in relational database tables, any reporting tool can use these tables to extract information for visual presentation. The report can show the various clusters discovered and let you drill into a specific cluster. You can also visualize the statistical distribution of shoppers in the cluster along the dimensions of the attributes used in the clustering operation. The reports can also compare the shoppers in the cluster against the total shopper population.

For illustration, we will use Intelligent Miner's demographic clustering algorithm which automatically determines the number of clusters to be generated. Similarities between records are determined by comparing their field values. The clusters are then defined so that Condorcet's criterion is maximized. Condorcet's criterion is the sum of all record similarities of pairs in the same cluster minus the sum of all record similarities of pairs in different clusters.

Initial clustering results typically are hierarchical in nature with contents defined as follows. Data mining results to be stored in relational form typically include a multiplicity of clusterings, and in typical embodiments of the present invention, we directly access the results of any of the available clusterings. For a given clustering, in typical embodiments, its results contain information such as symbolic and descriptive names for the clustering, the clustering algorithm used, number of items subject to clustering, number of attributes that influence the clustering, number of clusters obtained and detailed information on the clusters themselves. The detailed information within a cluster, in typical embodiments, contains such things as symbolic and descriptive names for the cluster, number of items in the cluster and statistics on how the items within the cluster are distributed along the dimensions defined by the attributes. The statistics information of a cluster in typical embodiments is described separately for each attribute, typically, for example, in attribute bin records. That is, in typical embodiments, the statistics for each attribute are described by dividing the attribute value range into bins and describing the statistics within each attribute bin separately. In typical embodiments, the statistics within an attribute bin are described by statistical measures such as sum of the item values and sum of the squares of the item values. The typical beginning point for a process of storing data mining results in relational form is a hierarchical structure of the kind depicted in FIG. 1a.

As mentioned briefly above, PMML (Predictive Modeling Markup Language) defines XML representations of mining results for various mining algorithms. In particular, PMML for Clustering defines the XML representation for the clustering results. Since PMML is becoming a standard across the industry, it is expected that many mining tools would begin to export mining results in PMML format. Intelligent Miner 6.1.1 already provides a facility to export clustering results in PMML format.

The main purpose of exporting mining results into PMML is to allow any mining tool to import the mining results and to score production data. PMML serves this purpose well. But there is another requirement on exported mining results: query and reporting tools should be able to import them and do mining visualizations. However, PMML is not an ideal representation for reporting tools because a reporting tool needs to be able to access any part of the data on-the-fly very quickly to provide drill down into the mining results with good response time for the interactive user. It is not possible to achieve such fast access for PMML data, particularly when the data is large, because the XML files need to parsed, the data item needs to be located by traversing the hierarchical representation of the XML data, and only then, the data item can be retrieved. Moreover, the current XML access methods require the whole XML file to reside in memory to be able to traverse the hierarchical data. This imposes undue memory requirements for large XML files and is not practical.

By defining a relational representation for clustering results, embodiments of the present invention make it possible to convert mining results offline from PMML to relational form so that the relational data can then be accessed on-the-fly very quickly by reporting tools by exploiting the fast indexing facilities of relational databases. Moreover, since relational databases store most of the data on disk and use memory only for caching purposes, there is no undue demand on memory requirements. Providing relational representation for mining results also makes it easy to integrate them with other multi-dimensional data to enable OLAP tools to access mining results.

Consider an exemplary embodiment, described in some detail below in this disclosure, having four tables: Clustering, Cluster, Attribute and Attrribute_bin. Notice that Cluster table has Clustering_id as a foreign key, Attribute table has both Cluster_id and Clustering_id as foreign keys, and Attribute_bin table has three foreign keys, namely, Attribute_id, Cluster_id and Clustering_id. If a reporting tool needs to access information on Attribute_bin 2 of Attribute 1 of Cluster 3 of Clustering 2, it only needs index the Attribute_bin table by supplying values for the four primary/foreign key values 2, 3, 1, 2 for Clustering_id, Cluster_id, Attribute_id and Bin_id respectively. Such indexing can be done very fast without having to refer to other tables. Similarly, the reporting tool can refer to other tables, for example, to the Cluster table to obtain the cluster name and description.

In typical examplary embodiments, conversion of PMML clustering results to relational form is carried out as illustrated by the following example pseudocode:

```
for each clustering do
{
    fill in the data in the clustering table
    for each cluster in the clustering do
    {
        fill in the data in the cluster table
        for each attribute of the cluster do
        {
            fill in the data in the attribute table
            for each attribute bin of the attribute table do
            {
                fill in the data in the Attribute_bin table
            }
        }
    }
}
```

Persons of skill in the art will recognize that reading a single attribute bin in the hierarchical format requires traversing all the records in the hierarchy above the attribute bin every time the attribute bin record is read. Persons skilled in the art will recognize that when the key fields for an attribute bin record are known, then that attribute bin record can be accessed directly in a single read operation in a relational database. Persons skilled in the art will recognize that reading a particular attribute bin record from a relational format practically never requires traversing a hierarchy as such. Persons skilled in the art will recognize that the illustrative example pseudocode set forth just above implements a traversal of the entire hierarchical PMML structure in order to fill in all the relational records. Persons of skill in the art will recognize that one of the principal advantages of the present invention is that by use of its embodiments, it is typically necessary to traverse a hierarchical format only once, in order to convert it to relational format, and that after that single traversal, typical embodiments provide all the speed and ease of access of the relational model for analysis, extraction, querying, and reporting upon the results of data mining.

Advantages of storing data mining results in relational form include the fact that the relational form is used not only by visualization tools but also are queried directly by use of any SQL enabled tool. This facilitates analysts to understand the data mining models even beyond what visualization tools may be able to convey. A relational form of data mining results makes it straightforward to embed them in any other product in developing an integrated solution. A relational representation of data mining results makes it possible to export and import data mining models across disparate data mining products.

Figure 1A:
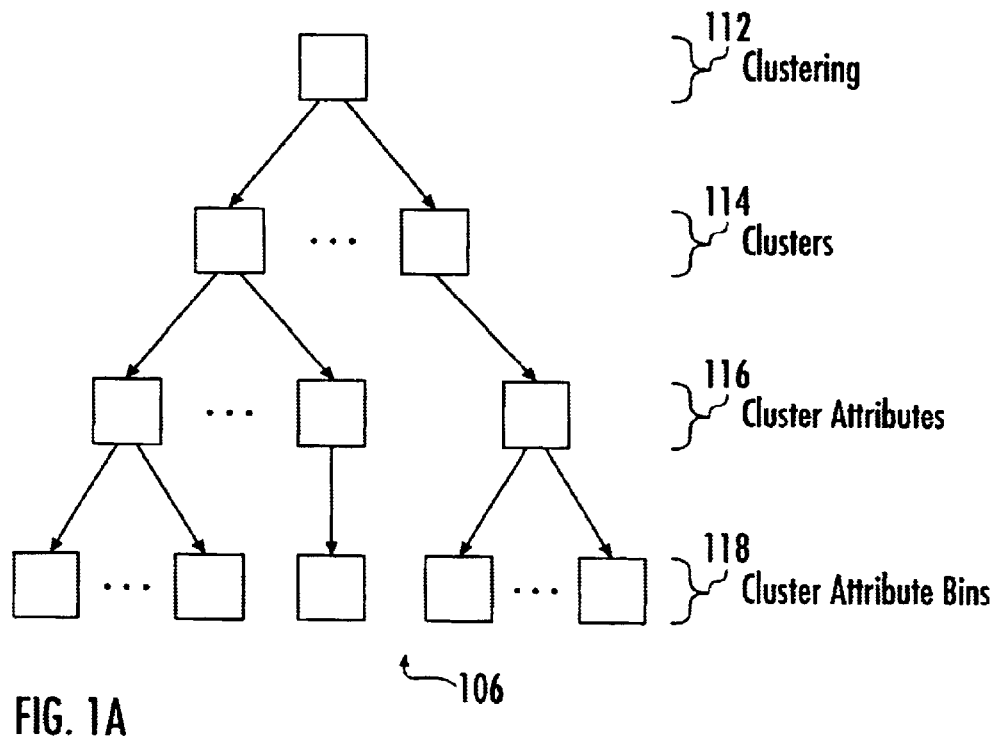
FIG. 1a is an example illustration of a hierarchical form of data mining results.
Figure 1B:
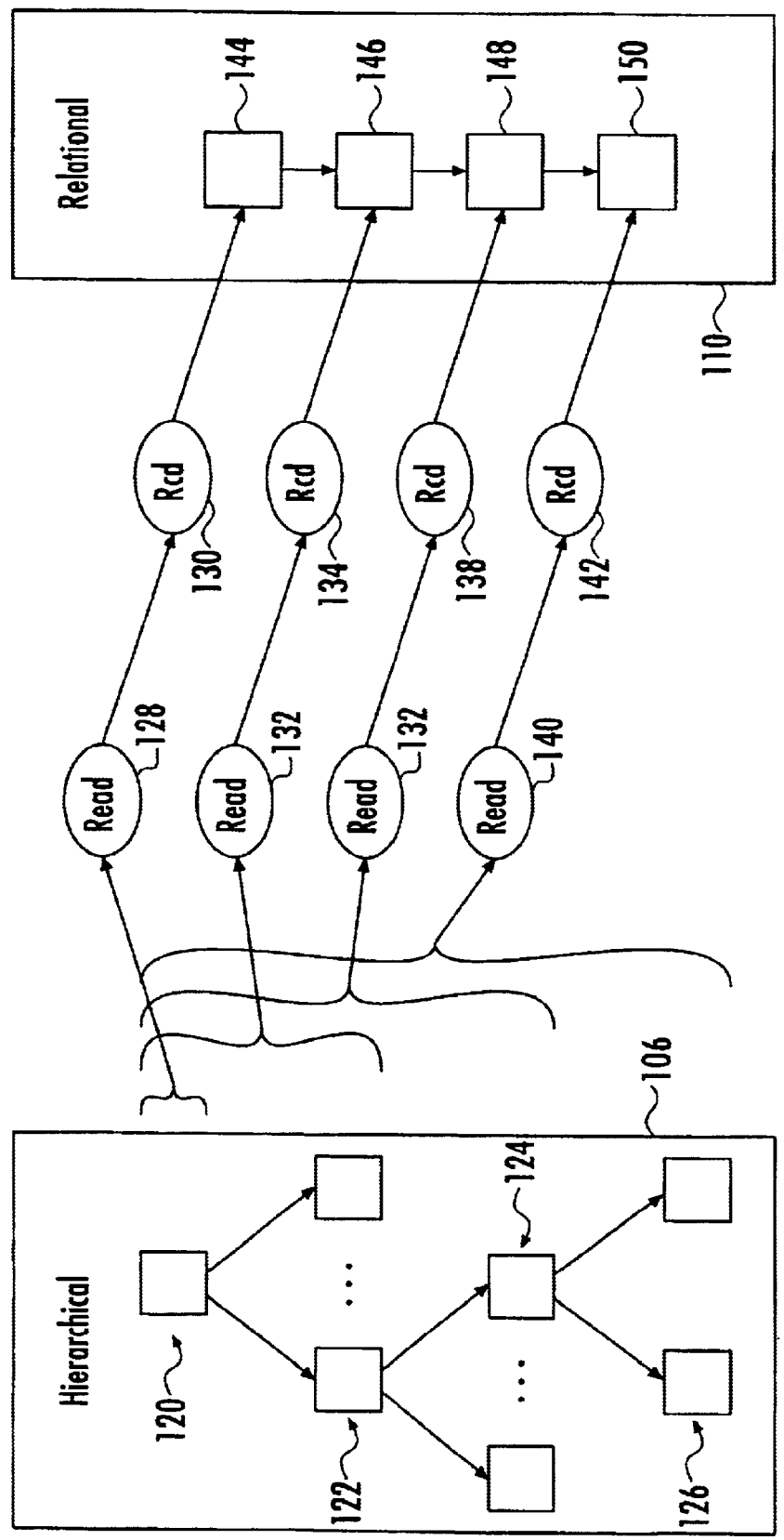
FIG. 1b is a more detailed process flow diagram illustrating a typical example embodiment of the present invention.

Turning now to FIG. 1, an embodiment of the present invention is seen as a system (100) for storing (108) data mining (104) clustering results (106) in a relational database (110) for querying and reporting. In FIG. 1b, a more detailed embodiment is shown as a method for storing data mining clustering results in a relational database for querying and reporting, the method applied to data mining results (106) from scoring of data items in operational data. The embodiment of FIG. 1b includes reading (128), from a hierarchical clustering node (120) embodied in a hierarchical representation of data mining results (106), clustering data describing a clustering, and recording (130) the clustering data in a relational clustering record (144). In typical embodiments, the relational clustering record includes a clustering identification field (reference 202 on FIG. 2).

The example embodiment illustrated in FIG. 1b includes reading (132), from a hierarchical cluster node (122) embodied in the hierarchical representation of data mining results, cluster data describing a cluster, and recording the cluster data in a relational cluster record (146). In typical embodiments of the kind illustrated, the hierarchical cluster node is embodied in a position (122) in the hierarchy below the hierarchical clustering node (120). In typical embodiments, the relational cluster record is related to the relational clustering record through a foreign key comprising the clustering identification field (as illustrated for example at reference 304 in FIG. 3), and the relational cluster record includes a cluster identification field (reference 302 in FIG. 3).

The example embodiment illustrated in FIG. 1b includes reading (132), from a hierarchical cluster attribute node (124) embodied in the hierarchical representation of data mining results, cluster attribute data describing a cluster attribute, and recording (138) the cluster attribute data in a relational cluster attribute record (148). In typical embodiments of the kind illustrated, the hierarchical cluster attribute node is embodied in a position in the hierarchy (124) below the hierarchical cluster node (122). In typical embodiments of the kind illustrated, the relational cluster attribute record (148) is related to the relational cluster record (146) through a foreign key comprising the cluster identification field (reference 406 in FIG. 4). In typical embodiments of the kind illustrated, the relational cluster attribute record (148) is related to the relational clustering (144) record through a foreign key comprising the clustering identification field (reference 404 in FIG. 4). In typical embodiments of the kind illustrated, the relational cluster attribute record (148) includes a cluster attribute identification field (402 in FIG. 4).

The example embodiment illustrated in FIG. 1b includes reading (140), from a hierarchical cluster attribute bin node (126) embodied in the hierarchical representation of data mining results, cluster attribute bin data describing a cluster attribute bin, and recording the cluster attribute bin data in a relational cluster attribute bin record (150). In typical embodiments of the kind illustrated the hierarchical cluster attribute bin node (126) is embodied in a position in the hierarchy below the hierarchical cluster attribute node (124), and the relational cluster attribute bin record (150) is related to the relational cluster attribute record through a foreign key comprising the cluster attribute identification field (reference 510 in FIG. 5). In typical embodiments of the kind shown in FIG. 1b, the relational cluster attribute bin record (150) is related to the relational cluster record (146) through a foreign key comprising the cluster identification field (reference 506 in FIG. 5), and in such typical embodiments, for example, the relational cluster attribute bin record (150) is related to the relational clustering record (144) through a foreign key comprising the clustering identification field (reference 504 in FIG. 5). In typical embodiments of the kind illustrated, the relational cluster attribute bin record (150) includes a cluster attribute bin identification field (reference 502 in FIG. 5). In typical embodiments, the cluster data, the clustering data, the clustering attribute data, and the cluster attribute bin data comprise data mining results generated by at least one data mining operation performed upon operational data using a trained data mining model.

Turning now to FIG. 2, a more detailed embodiment of a relational clustering record is shown wherein the clustering data as recorded in the relational clustering record comprises a unique identifier for the relational clustering record (202), a text name for the clustering (204), a text description of the purpose of a clustering represented by the relational clustering record (205), a clustering type (206), a number of clusters given by the clustering (208), a number of attributes considered in the clustering (210), an algorithm field identifying the clustering algorithm used in the clustering (212), and an items numeric field that stores the number of data items input to the clustering from the operational data (214). In some embodiments, the clustering type (206) has the value "demographic." In some embodiments, the clustering type (206) has the value "neural."

The following DDL code is an example of a script useful within the present invention to create a relational clustering record based upon the relational data format described above and illustrated in FIG. 2.

```
create table Clustering (
    Clustering_id    integer not null,
    Clustering_name  varchar(64),
    Clustering_desc  varchar(254),
    Clustering_type  integer,
    Num_clusters     integer,
    Num_attributes   integer,
    Clustering_alg   integer,
    Num_items        integer,
primary key (Clustering_id)
);
```

Turning now to FIG. 3, a more detailed embodiment of a relational cluster record is shown wherein the cluster data as recorded in the relational cluster record includes a unique identifier for the cluster (302), a unique identifier of a relational clustering record to which the relational cluster record related (304), an ordinal number of the relational cluster record (305), a text description of the purpose of the cluster represented by the relational cluster record (306), and a numeric field identifying the number of data items from the operational data that are represented in records related to the relational cluster record (308).

The following DDL code is an example of a script useful within the present invention to create a relational cluster record based upon the relational data format described above and illustrated in FIG. 3.

```
create table Cluster (
    Cluster_id     integer not null,
    Clustering_id  integer not null,
    Cluster_index  integer,
    Cluster_name   varchar(64),
    Cluster_desc   varchar(254),
    Num_items      integer,
    primary key (Clustering_id, Cluster_id)
);
```

Turning now to FIG. 4, a more detailed example embodiment of a relational cluster attribute record is seen wherein the cluster attribute data as recorded in the relational cluster attribute record includes a unique identifier of the relational cluster attribute record (402), a unique identifier of a relational clustering record to which the relational cluster attribute record is related (404), a unique identifier of a relational cluster record to which the relational cluster attribute record is related (406), an attribute type (498), a text name of a relational cluster attribute represented by the relational cluster attribute record (410), a text description of the relational cluster attribute (412), a use type field (414), a categories numeric field indicating a number of categories associated with the cluster attribute when the attribute type has the value "categorical" (416), a lowest value numeric field indicating a lowest value allowed when the attribute type has the value "continuous" (418), a highest value numeric field indicating a highest value allowed when the attribute type has the value "continuous" (420), and an items numeric field identifying the number of data items from the operational data that are represented in records related to the relational cluster attribute record (422).

In some embodiments of the kind illustrated in FIG. 4, the use type field has the value "active." In some embodiments of the kind illustrated in FIG. 4, the use type field has the value "supplementary." In some embodiments of the kind illustrated in FIG. 4, the attribute type has the value "categorical." In some embodiments of the kind illustrated in FIG. 4, the attribute type has the value "continuous."

The following DDL code is an example of a script useful within the present invention to create a relational cluster attribute record based upon the relational data format described above and illustrated in FIG. 4.

```
create table Attribute (
    Attribute_id     integer not null,
    Clustering_id    integer not null,
    Cluster_id       integer not null,
    Attribute_type   integer,
    Attribute_name   varchar(32) not null,
    Attribute_desc   varchar(254),
    Active_sup_type  integer,
    Num_categories   integer,
    From_range       double,
    To_range         double,
    Num_items        integer,
    primary key (Clustering_id, Cluster_id, Attribute_id)
);
```

Turning now to FIG. 5, a more detailed embodiment of a relational cluster attribute bin record is shown wherein the cluster attribute bin data as recorded in the relational cluster attribute bin record includes a unique identifier of the attribute bin (502), a unique identifier of a relational clustering record to which the relational attribute bin record is related (504), a unique identifier of a relational cluster record to which the relational attribute bin record is related (506), a unique identifier of a relational attribute record to which the relational attribute bin record is related (510), a text name for the attribute bin represented by the relational attribute bin record (514), a category name (516), a lowest value numeric field in which is stored the lowest value in the bin (518), a highest value numeric record in which is stored the highest value in the bin (520), an items numeric field in which is stored the number of items in the bin (522), a values sum numeric field in which is stored the sum of the values in the bin (524), and a squares numeric field in which is stored the sum of the squares of values in the bin (526).

The following DDL code is an example of a script useful within the present invention to create a relational cluster attribute bin record based upon the relational data format described above and illustrated in FIG. 5.

```
create table Attribute_bin (
    Bin_id              integer not null,
    Clustering_id       integer not null,
    Cluster_id          integer not null,
    Attribute_id        integer not null,
    Bin_name            varchar(64),
    Category_name       varchar(64),
    From_range          double,
    To_range            double,
    Num_items           integer,
    Value_sum           double,
    Value_sqr_sum       double,
    primary key (Clustering_id, Cluster_id, Attribute_id, Bin_id)
);
```

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed is:

1. A method for storing data mining clustering results in a relational database for querying and reporting, the method applied to data mining results from scoring of data items in operational data, the method comprising the steps of:

reading, from a hierarchical clustering node embodied in a hierarchical representation of data mining results, clustering data describing a clustering, and recording the clustering data in a relational clustering record, wherein the relational clustering record includes a clustering identification field;

reading, from a hierarchical cluster node embodied in the hierarchical representation of data mining results, cluster data describing a cluster, and recording the cluster data in a relational cluster record, wherein the hierarchical cluster node is embodied in a position in the hierarchy below the hierarchical clustering node, the relational cluster record is related to the relational clustering record through a first foreign key comprising the clustering identification field; and the relational cluster record includes a cluster identification field;

reading, from a hierarchical cluster attribute node embodied in the hierarchical representation of data mining results, cluster attribute data describing a cluster attribute, and recording the cluster attribute data in a relational cluster attribute record, wherein the hierarchical cluster attribute node is embodied in a position in the hierarchy below the hierarchical cluster node, the relational cluster attribute record is related to the relational cluster record through a second foreign key comprising the cluster identification field;

the relational cluster attribute record is related to the relational clustering record through a third foreign key comprising the clustering identification field; and the relational cluster attribute record includes a cluster attribute identification field;

reading, from a hierarchical cluster attribute bin node embodied in the hierarchical representation of data mining results, cluster attribute bin data describing a cluster attribute bin, and recording the cluster attribute bin data in a relational cluster attribute bin record, wherein the hierarchical cluster attribute bin node is embodied in a position in the hierarchy below the hierarchical cluster attribute node, the relational cluster attribute bin record is related to the relational cluster attribute record through a fourth foreign key comprising the cluster attribute identification field;

the relational cluster attribute bin record is related to the relational cluster record through a fifth foreign key comprising the cluster identification field; and the relational cluster attribute bin record is related to the relational clustering record through a sixth foreign key comprising the clustering identification field;

wherein the cluster data, the clustering data, the clustering attribute data, and the cluster attribute bin data comprise data mining results generated by at least one data mining operation performed upon operational data using a trained data mining model.

2. The method of claim 1 wherein the relational cluster attribute bin record includes a cluster attribute bin identification field.

3. The method of claim 1 wherein the clustering data as recorded in the relational clustering record comprises:

a unique identifier for the relational clustering record;

a text description of the purpose of a clustering represented by the relational clustering record;

a clustering type;

a number of clusters given by the clustering;

a number of attributes considered in the clustering;

an algorithm field identifying the clustering algorithm used in the clustering; and an items numeric field that stores the number of data items input to the clustering from the operational data.

4. The method of claim 3 wherein the clustering type has the value "demographic."

5. The method of claim 3 wherein the clustering type has the value "neural."

6. The method of claim 1 wherein the cluster data as recorded in the relational cluster record comprises:

a unique identifier for the cluster;

a unique identifier of a relational clustering record to which the relational cluster record related;

an ordinal number of the relational cluster record;

a text description of the purpose of the cluster represented by the relational cluster record; and a numeric field identifying the number of data items from the operational data that are represented in records related to the relational cluster record.

7. The method of claim 1 wherein the cluster attribute data as recorded in the relational cluster attribute record comprises:

a unique identifier of the relational cluster attribute record;

a unique identifier of a relational clustering record to which the relational cluster attribute record is related;

a unique identifier of a relational cluster record to which the relational cluster attribute record is related;

an attribute type;

a text name of a relational cluster attribute represented by the relational cluster attribute record;

a text description of the relational cluster attribute;

a use type field;

a categories numeric field indicating a number of categories associated with the cluster attribute when the attribute type has the value "categorical;"

a lowest value numeric field indicating a lowest value allowed when the attribute type has the value "continuous;"

a highest value numeric field indicating a highest value allowed when the attribute type has the value "continuous;"

an items numeric field identifying the number of data items from the operational data that are represented in records related to the relational cluster attribute record.

8. The method of claim 7 wherein the use type field has the value "active."

9. The method of claim 7 wherein the use type field has the value "supplementary."

10. The method of claim 7 wherein the attribute type has the value "categorical."

11. The method of claim 7 wherein the attribute type has the value "continuous."

12. The method of claim 1 wherein the cluster attribute bin data as recorded in the relational cluster attribute bin record comprises:

a unique identifier of the attribute bin;

a unique identifier of a relational clustering record to which the relational attribute bin record is related;

a unique identifier of a relational cluster record to which the relational attribute bin record is related;

a unique identifier of a relational attribute record to which the relational attribute bin record is related;

a text name for the attribute bin represented by the relational attribute bin record;

a category name;

a lowest value numeric field in which is stored the lowest value in the bin;

a highest value numeric record in which is stored the highest value in the bin;

an items numeric field in which is stored the number of items in the bin;

a values sum numeric field in which is stored the sum of the values in the bin; and a squares numeric field in which is stored the sum of the squares of values in the bin.

13. A computer system for storing data mining clustering results in a relational database for querying and reporting, the computer system comprising a processor and a computer memory, the computer memory coupled to the processor, the computer memory comprising an electronic circuit configured to store computer programs and data, the data comprising results of data mining operations conducted upon data items of operational data, the processor programmed to:

read, from a hierarchical clustering node embodied in a hierarchical representation of data mining results, clustering data describing a clustering, and record the clustering data in a relational clustering record, wherein the relational clustering record includes a clustering identification field;

read, from a hierarchical cluster node embodied in the hierarchical representation of data mining results, cluster data describing a cluster, and recording the cluster data in a relational cluster record, wherein the hierarchical cluster node is embodied in a position in the hierarchy below the hierarchical clustering node, the relational cluster record is related to the relational clustering record through a first foreign key comprising the clustering identification field; and the relational cluster record includes a cluster identification field;

read, from a hierarchical cluster attribute node embodied in the hierarchical representation of data mining results, cluster attribute data describing a cluster attribute, and record the cluster attribute data in a relational cluster attribute record, wherein the hierarchical cluster attribute node is embodied in a position in the hierarchy below the hierarchical cluster node, the relational cluster attribute record is related to the relational cluster record through a second foreign key comprising the cluster identification field;

the relational cluster attribute record is related to the relational clustering record through a third foreign key comprising the clustering identification field; and the relational cluster attribute record includes a cluster attribute identification field;

read, from a hierarchical cluster attribute bin node embodied in the hierarchical representation of data mining results, cluster attribute bin data describing a cluster attribute bin, and record the cluster attribute bin data in a relational cluster attribute bin record, wherein the hierarchical cluster attribute bin node is embodied in a position in the hierarchy below the hierarchical cluster attribute node, the relational cluster attribute bin record is related to the relational cluster attribute record through a fourth foreign key comprising the cluster attribute identification field;

the relational cluster attribute bin record is related to the relational cluster record through a fifth foreign key comprising the cluster identification field; and the relational cluster attribute bin record is related to the relational clustering record through a sixth foreign key comprising the clustering identification field;

wherein the cluster data, the clustering data, the clustering attribute data, and the cluster attribute bin data comprise data mining results generated by at least one data mining operation performed upon operational data using a trained data mining model.

14. The computer system of claim 13 wherein the relational cluster attribute bin record includes a cluster attribute bin identification field.

15. The computer system of claim 13 wherein the processor is further programmed to record the clustering data in the computer memory in the relational clustering record, wherein the relational clustering record comprises:

a unique identifier for the relational clustering record;

a text description of the purpose of a clustering represented by the relational clustering record;

a clustering type;

a number of clusters given by the clustering;

a number of attributes considered in the clustering;

an algorithm field identifying the clustering algorithm used in the clustering; and an items numeric field that stores the number of data items input to the clustering from the operational data.

16. The computer system of claim 15 wherein the clustering type has the value "demographic."

17. The computer system of claim 15 wherein the clustering type has the value "neural."

18. The computer system of claim 13 wherein the processor is further programmed to record the cluster data in the computer memory in the relational cluster record, wherein the relational cluster record comprises:
   a unique identifier for the cluster;
   a unique identifier of a relational clustering record to which the relational cluster record related;
   an ordinal number of the relational cluster record;
   a text description of the purpose of the cluster represented by the relational cluster record; and
   a numeric field identifying the number of data items from the operational data that are represented in records related to the relational cluster record.

19. The computer system of claim 13 wherein the processor is further programmed to record the cluster attribute data in the relational cluster attribute record, wherein the relational cluster attribute record comprises:
   a unique identifier of the relational cluster attribute record;
   a unique identifier of a relational clustering record to which the relational cluster attribute record is related;
   a unique identifier of a relational cluster record to which the relational cluster attribute record is related;
   an attribute type;
   a text name of a relational cluster attribute represented by the relational cluster attribute record;
   a text description of the relational cluster attribute;
   a use type field;
   a categories numeric field indicating a number of categories associated with the cluster attribute when the attribute type has the value "categorical;"
   a lowest value numeric field indicating a lowest value allowed when the attribute type has the value "continuous;"
   a highest value numeric field indicating a highest value allowed when the attribute type has the value "continuous;"
   an items numeric field identifying the number of data items from the operational data that are represented in records related to the relational cluster attribute record.

20. The computer system of claim 19 wherein the use type field has the value "active."

21. The computer system of claim 19 wherein the use type field has the value "supplementary."

22. The computer system of claim 19 wherein the attribute type has the value "categorical."

23. The computer system of claim 19 wherein the attribute type has the value "continuous."

24. The computer system of claim 13 wherein the processor is further programmed to record the cluster attribute bin data in the relational cluster attribute bin record, wherein the relational cluster attribute bin record comprises:
   a unique identifier of the attribute bin;
   a unique identifier of a relational clustering record to which the relational attribute bin record is related;
   a unique identifier of a relational cluster record to which the relational attribute bin record is related;
   a unique identifier of a relational attribute record to which the relational attribute bin record is related;
   a text name for the attribute bin represented by the relational attribute bin record;
   a category name;
   a lowest value numeric field in which is stored the lowest value in the bin;
   a highest value numeric record in which is stored the highest value in the bin;
   an items numeric field in which is stored the number of items in the bin;
   a values sum numeric field in which is stored the sum of the values in the bin; and
   a squares numeric field in which is stored the sum of the squares of values in the bin.

25. A computer system for storing data mining clustering results in a relational database for querying and reporting, the computer system applied to data mining results from scoring of data items in operational data, the computer system comprising:
   means for reading, from a hierarchical clustering node embodied in a hierarchical representation of data mining results, clustering data describing a clustering, and means for recording the clustering data in a relational clustering record, wherein the relational clustering record includes a clustering identification field;
   means for reading, from a hierarchical cluster node embodied in the hierarchical representation of data mining results, cluster data describing a cluster, and means for recording the cluster data in a relational cluster record, wherein
      the hierarchical cluster node is embodied in a position in the hierarchy below the hierarchical clustering node,
      the relational cluster record is related to the relational clustering record through a first foreign key comprising the clustering identification field; and
      the relational cluster record includes a cluster identification field;
   means for reading, from a hierarchical cluster attribute node embodied in the hierarchical representation of data mining results, cluster attribute data describing a cluster attribute, and means for recording the cluster attribute data in a relational cluster attribute record, wherein
      the hierarchical cluster attribute node is embodied in a position in the hierarchy below the hierarchical cluster node,
      the relational cluster attribute record is related to the relational cluster record through a second foreign key comprising the cluster identification field;
      the relational cluster attribute record is related to the relational clustering record through a third foreign key comprising the clustering identification field; and
      the relational cluster attribute record includes a cluster attribute identification field;
   means for reading, from a hierarchical cluster attribute bin node embodied in the hierarchical representation of data mining results, cluster attribute bin data describing a cluster attribute bin, and means for recording the cluster attribute bin data in a relational cluster attribute bin record, wherein
      the hierarchical cluster attribute bin node is embodied in a position in the hierarchy below the hierarchical cluster attribute node,
      the relational cluster attribute bin record is related to the relational cluster attribute record through a fourth foreign key comprising the cluster attribute identification field;

the relational cluster attribute bin record is related to the relational cluster record through a fifth foreign key comprising the cluster identification field; and the relational cluster attribute bin record is related to the relational clustering record through a sixth foreign key comprising the clustering identification field;

wherein the cluster data, the clustering data, the clustering attribute data, and the cluster attribute bin data comprise data mining results generated by at least one data mining operation performed upon operational data using a trained data mining model.

26. The computer system of claim 25 wherein the relational cluster attribute bin record includes a cluster attribute bin identification field.

27. The computer system of claim 25 wherein the clustering data in the relational clustering record comprises:

a unique identifier for the relational clustering record;

a text description of the purpose of a clustering represented by the relational clustering record;

a clustering type;

a number of clusters given by the clustering;

a number of attributes considered in the clustering;

an algorithm field identifying the clustering algorithm used in the clustering; and an items numeric field that stores the number of data items input to the clustering from the operational data.

28. The computer system of claim 27 wherein the clustering type has the value "demographic."

29. The computer system of claim 27 wherein the clustering type has the value "neural."

30. The computer system of claim 25 wherein the cluster data in the relational cluster record comprises:

a unique identifier for the cluster;

a unique identifier of a relational clustering record to which the relational cluster record related;

an ordinal number of the relational cluster record;

a text description of the purpose of the cluster represented by the relational cluster record; and a numeric field identifying the number of data items from the operational data that are represented in records related to the relational cluster record.

31. The computer system of claim 25 wherein the cluster attribute data in the relational cluster attribute record comprises:

a unique identifier of the relational cluster attribute record;

a unique identifier of a relational clustering record to which the relational cluster attribute record is related;

a unique identifier of a relational cluster record to which the relational cluster attribute record is related;

an attribute type;

a text name of a relational cluster attribute represented by the relational cluster attribute record;

a text description of the relational cluster attribute;

a use type field;

a categories numeric field indicating a number of categories associated with the cluster attribute when the attribute type has the value "categorical;"

a lowest value numeric field indicating a lowest value allowed when the attribute type has the value "continuous;"

a highest value numeric field indicating a highest value allowed when the attribute type has the value "continuous;"

an items numeric field identifying the number of data items from the operational data that are represented in records related to the relational cluster attribute record.

32. The computer system of claim 31 wherein the use type field has the value "active."

33. The computer system of claim 31 wherein the use type field has the value "supplementary."

34. The computer system of claim 31 wherein the attribute type has the value "categorical."

35. The computer system of claim 31 wherein the attribute type has the value "continuous."

36. The computer system of claim 25 wherein the cluster attribute bin data in the relational cluster attribute bin record comprises:

a unique identifier of the attribute bin;

a unique identifier of a relational clustering record to which the relational attribute bin record is related;

a unique identifier of a relational cluster record to which the relational attribute bin record is related;

a unique identifier of a relational attribute record to which the relational attribute bin record is related;

a text name for the attribute bin represented by the relational attribute bin record;

a category name;

a lowest value numeric field in which is stored the lowest value in the bin;

a highest value numeric record in which is stored the highest value in the bin;

an items numeric field in which is stored the number of items in the bin;

a values sum numeric field in which is stored the sum of the values in the bin; and a squares numeric field in which is stored the sum of the squares of values in the bin.

37. A computer program product for storing data mining clustering results in a relational database for querying and reporting, the computer program product applied to data mining results from scoring of data items in operational data, the computer program product comprising:

a recording medium;

means, recorded on the recording medium, for reading, from a hierarchical clustering node embodied in a hierarchical representation of data mining results, clustering data describing a clustering, and means, recorded on the recording medium, for recording the clustering data in a relational clustering record, wherein the relational clustering record includes a clustering identification field;

means, recorded on the recording medium, for reading, from a hierarchical cluster node embodied in the hierarchical representation of data mining results, cluster data describing a cluster, and means, recorded on the recording medium, for recording the cluster data in a relational cluster record, wherein the hierarchical cluster node is embodied in a position in the hierarchy below the hierarchical clustering node, the relational cluster record is related to the relational clustering record through a first foreign key comprising the clustering identification field; and the relational cluster record includes a cluster identification field;

means, recorded on the recording medium, for reading, from a hierarchical cluster attribute node embodied in the hierarchical representation of data mining results, cluster attribute data describing a cluster attribute, and means, recorded on the recording medium, for recording the cluster attribute data in a relational cluster attribute record, wherein the hierarchical cluster attribute node is embodied in a position in the hierarchy below the hierarchical cluster node, the relational cluster attribute record is related to the relational cluster record through a second foreign key comprising the cluster identification field;

the relational cluster attribute record is related to the relational clustering record through a third foreign key comprising the clustering identification field; and the relational cluster attribute record includes a cluster attribute identification field;

means, recorded on the recording medium, for reading, from a hierarchical cluster attribute bin node embodied in the hierarchical representation of data mining results, cluster attribute bin data describing a cluster attribute bin, and means, recorded on the recording medium, for recording the cluster attribute bin data in a relational cluster attribute bin record, wherein the hierarchical cluster attribute bin node is embodied in a position in the hierarchy below the hierarchical cluster attribute node, the relational cluster attribute bin record is related to the relational cluster attribute record through a fourth foreign key comprising the cluster attribute identification field;

the relational cluster attribute bin record is related to the relational cluster record through a fifth foreign key comprising the cluster identification field; and the relational cluster attribute bin record is related to the relational clustering record through a sixth foreign key comprising the clustering identification field;

wherein the cluster data, the clustering data, the clustering attribute data, and the cluster attribute bin data comprise data mining results generated by at least one data mining operation performed upon operational data using a trained data mining model.

38. The computer program product of claim 25 wherein the relational cluster attribute bin record includes a cluster attribute bin identification field.

39. The computer program product of claim 25 wherein means, recorded on the recording medium, for recording the clustering data in the relational clustering record further comprises means, recorded on the recording medium, for recording:

a unique identifier for the relational clustering record;

a text description of the purpose of a clustering represented by the relational clustering record;

a clustering type;

a number of clusters given by the clustering;

a number of attributes considered in the clustering;

an algorithm field identifying the clustering algorithm used in the clustering; and an items numeric field that stores the number of data items input to the clustering from the operational data.

40. The computer program product of claim 27 wherein the clustering type has the value "demographic."

41. The computer program product of claim 27 wherein the clustering type has the value "neural."

42. The computer program product of claim 25 wherein means, recorded on the recording medium, for recording the cluster data in the relational cluster record further comprises means, recorded on the recording medium, for recording:

a unique identifier for the cluster;

a unique identifier of a relational clustering record to which the relational cluster record related;

an ordinal number of the relational cluster record;

a text description of the purpose of the cluster represented by the relational cluster record; and a numeric field identifying the number of data items from the operational data that are represented in records related to the relational cluster record.

43. The computer program product of claim 25 wherein means, recorded on the recording medium, for recording the cluster attribute data in the relational cluster attribute record further comprises means, recorded on the recording medium, for recording:

a unique identifier of the relational cluster attribute record;

a unique identifier of a relational clustering record to which the relational cluster attribute record is related;

a unique identifier of a relational cluster record to which the relational cluster attribute record is related;

an attribute type;

a text name of a relational cluster attribute represented by the relational cluster attribute record;

a text description of the relational cluster attribute;

a use type field;

a categories numeric field indicating a number of categories associated with the cluster attribute when the attribute type has the value "categorical;"

a lowest value numeric field indicating a lowest value allowed when the attribute type has the value "continuous;"

a highest value numeric field indicating a highest value allowed when the attribute type has the value "continuous;"

an items numeric field identifying the number of data items from the operational data that are represented in records related to the relational cluster attribute record.

44. The computer program product of claim 31 wherein the use type field has the value "active."

45. The computer program product of claim 31 wherein the use type field has the value "supplementary."

46. The computer program product of claim 31 wherein the attribute type has the value "categorical."

47. The computer program product of claim 31 wherein the attribute type has the value "continuous."

48. The computer program product of claim 25 wherein means, recorded on the recording medium, for recording the cluster attribute bin data in the relational cluster attribute bin record further comprises means, recorded on the recording medium, for recording:

a unique identifier of the attribute bin;

a unique identifier of a relational clustering record to which the relational attribute bin record is related;

a unique identifier of a relational cluster record to which the relational attribute bin record is related;

a unique identifier of a relational attribute record to which the relational attribute bin record is related;

a text name for the attribute bin represented by the relational attribute bin record;

a category name;

a lowest value numeric field in which is stored the lowest value in the bin;

a highest value numeric record in which is stored the highest value in the bin;

an items numeric field in which is stored the number of items in the bin;

a values sum numeric field in which is stored the sum of the values in the bin; and a squares numeric field in which is stored the sum of the squares of values in the bin.

* * * * *